United States Patent [19]

Reymann et al.

[11] Patent Number: 5,234,637
[45] Date of Patent: Aug. 10, 1993

[54] METHOD FOR CONTROLLING THE TEMPERATURE OF A LAYER IN CONTACT WITH A PLASTIC MATERIAL

[75] Inventors: Wolfgang Reymann; Wolf-Rüdiger Jaksztat, both of Hamburg, Fed. Rep. of Germany

[73] Assignee: Krupp Corpoplast Maschinenbau GmbH, Fed. Rep. of Germany

[21] Appl. No.: 411,032

[22] Filed: Sep. 22, 1989

[30] Foreign Application Priority Data

Sep. 22, 1988 [DE] Fed. Rep. of Germany ....... 3832284

[51] Int. Cl.$^5$ ..................... B29C 33/02; B29C 35/02; B29C 49/64
[52] U.S. Cl. .................... 264/40.6; 264/235; 264/346; 264/523; 425/144; 425/526
[58] Field of Search ........ 264/40.6, 235, 234, 264/521, 535, 345, 523, 346; 425/143, 144, 526; 249/78; 219/499

[56] References Cited

U.S. PATENT DOCUMENTS

| | | | |
|---|---|---|---|
| 2,979,773 | 4/1961 | Bolstad | 18/34 |
| 3,039,139 | 6/1962 | Nishioka et al. | 18/5.3 |
| 3,185,432 | 1/1962 | Hager, Jr. | 249/78 |
| 3,789,190 | 1/1974 | Orosy et al. | 219/499 |
| 3,866,669 | 2/1975 | Gardner | 425/144 |
| 4,496,131 | 1/1985 | Yang | 249/78 |
| 4,546,239 | 10/1985 | Sugimori | 219/501 |
| 4,897,028 | 1/1990 | Barancik et al. | 425/144 |
| 5,007,818 | 4/1991 | Barancik et al. | 425/144 |

FOREIGN PATENT DOCUMENTS

| | | | |
|---|---|---|---|
| 2348327 | 4/1974 | Fed. Rep. of Germany . | |
| 1578607 | 8/1969 | France . | |
| 2551612 | 3/1985 | France . | |
| 55-118833 | 9/1980 | Japan | 249/78 |
| 59-109309 | 6/1984 | Japan | 425/144 |

OTHER PUBLICATIONS

JP 55 67417 A. In: Patents Abstracts of Japan, M-24, Aug. 5, 1980, vol. 4, No. 108 (1 Page).

*Primary Examiner*—Jan H. Silbaugh
*Assistant Examiner*—Catherine Timm
*Attorney, Agent, or Firm*—Harness, Dickey & Pierce

[57] ABSTRACT

A method and apparatus for thermally processing a material, such as a plastic material made of PET, in contact with a very thin heating layer that is provided on a body, such as a blow-mold. The intensity of current supplied to the heating layer is controlled as a function of the medium temperature in the heating layer to allow the heating layer to very rapidly heat up the plastic material contacting the heating layer. After switching off the heating current the plastic material is rapidly cooled down to the temperature of the body carrying the heating layer. This process may be applied to the heat setting process of blow-molded hollow articles made of PET.

5 Claims, 3 Drawing Sheets

METHOD FOR CONTROLLING THE TEMPERATURE OF A LAYER IN CONTACT WITH A PLASTIC MATERIAL

The invention relates to a method and to an apparatus for heating and cooling a material contacting a body, in particular a plastic material.

BACKGROUND OF THE INVENTION

The invention may be used in molding plastic material which is introduced in a mold by injection or in a blow-mold when making hollow articles. The mold is being cooled for solidifying the plastic material of which at least the outer layer shall be temporarily heated up before or during the cooling step.

For example, extrusion blown articles receive a glossy surface, when the plastic material after being brought into contact with the inner surface of the mold is temporarily heated at its surface so that a thin outer layer comes to melting whereupon the surface subsequently participates again in the cooling step to solidify the material.

As a further example, in processing polymers capable of crystallization the polymer may be heat set by a temporary heating step. The article blow-molded exhibits a relatively thin wall thickness. According to the prior art the material subjected to the blow pressure and contacting the inner surface of the blow-mold is heated throughout for some time until crystallization takes place. Subsequently, the material is cooled to obtain stability.

In an injection molding process it can be helpful to heat narrow passages of the form during the filling step. These passages must be then cooled when the material injected is solidified.

A variety of devices is known to perform a heating step followed by cooling blow-molded articles in a rather short time and with little loss of energy. For example, a blow-mold may be provided with internal passages to alternatively receive a hot and a chilled liquid. Further, the blow-mold may be provided with separate heating and cooling passages. As a further example of the prior art a blow-mold may be lined by a pair of thin walled shells which are separate with respect to the blow-mold body to allow the shells to become rapidly cooled and heated.

OBJECT OF THE INVENTION

It is an object of the present invention to provide a method and an apparatus to rapidly control the temperature of a surface which is in contact with a plastic material. It is a further object to avoid high losses of energy. A still further object is to improve the temperature control. According to the invention the temperature during the heating phase is substantially determined by the current intensity in a very thin electrical heating layer provided on a body while the temperature in the cooling phase is substantially determined by the temperature of the body itself. The flow of energy through the electrical heating layer is controlled as a function of the temperature in the heating phase.

According to a particularly important aspect of the invention, the electrically conductive heating layer is heated by current pulses; during the intervals between the pulses the temperature-responsive resistance of the heating layer is determined by a measuring current sent through the layer and the length and/or the amplitude of the heating pulses is controlled as a function of the measuring current signals.

According to the invention the body or the substrate carrying the electrical heating layer is continuously or intermittently cooled as required by the solidifying step in processing the material.

According to a further aspect of the invention, an isolating layer may be provided between the heating layer and the substrate. The isolating layer should possess certain characteristics such as a relatively high electrical resistance to obtain electrical insulation. The isolating layer further should exhibit good heat conductivity to obtain the desired temperature drop between the heating layer and the substrate. The layer further possesses a mechanically high adhesitivity between the heating layer and the substrate. The isolating layer may comprise a number of layers each one exhibiting one dominating characteristic.

The heating layer according to the invention is defined by a surface heating element deposited on an insulating substrate. The heating layer is heated by current pulses the intensity thereof being controlled as a function of the medium temperature of the heating layer. Preferably, the heating layer has a substantially constant cross-sectional area to provide a uniform heating of the layer throughout. The thickness of the layer is selected to be very thin to allow for a very rapid heating up so that little heating energy is stored. A further characteristic of the heating layer is to rapidly transfer the heat to the contacting material.

As an example the heating layer may comprise a very thin copper layer of 1/100 to 1/10 mm. This illustrates that the cross-section of the heating layer responsive for the heating process must be selected very small with respect to the cross-section necessary for supplying the current.

The temperature control according to the invention operates very sensitive and with high speed. The invention allows a high speed generation of the measuring signals to control the current pulses in the heating layer. The thinner the layer is selected the more rapidly the layer reacts with a temperature change when the current is varied.

As mentioned before the temperature responsive resistance of the heating layer is measured in the intervals between the heating current pulses by supplying pulses of a measuring current to the heating layer. The amplitude of these pulses received is a measure for the temperature prevailing in the heating layer. The measured values are compared with a desired value adjustable to generate an error signal to control the pulse width of the heating current pulses supplied. The control circuit comprises conventional components.

According to a further aspect the measuring signal determines the pulse length for the next following heating current pulse or the next following group of pulses. Furthermore, a number of measuring pulses may be averaged and the average value may be updated by any following measuring pulses. In using such type of control a very high temperature may be safely controlled in a very thin heating layer.

It is again referred to the very small amount of heat stored in the heating layer. When the heating layer is made of copper it has a very high heat conductivity which allows it to rapidly transfer the heat stored to the plastic material. As soon as the heating current is switched off the heating phase is terminated and the cooling phase begins in which the temperature potential of the body carrying the heating layer determines the surface temperature. A small wall thickness of the isolating layer as well as of the heating layer accelerate the cooling step. Thus, there is a number of reasons to select the thickness of the heating layer as thin as possible. Preferably, the heating and the isolating layers are deposited galvanically or by a conventional plasma process in vacuum.

Preferably, the method of the invention is applied to blow-molded hollow articles to be processed in a blow-mold. However, the invention is not limited to this use. Rather, the invention broadly relates to a heating layer allowing a very rapid heating and cooling of a material contacting the heating layer and a novel temperature control.

BRIEF DESCRIPTION OF THE DRAWINGS

An embodiment of the invention is described in the following specification taken in conjunction with the drawings.

FIG. 1 shows a blow-mold body 1 including channels 2 for a chilling liquid. An electrically insulating layer 3 is deposited on the inner surface of the body 1 and the layer 3 carries an electrically conductive heating layer 4. The heating layer 4 is connected through terminals 5 to a power source not shown. The cross-sections illustrated in FIG. 2 for the heating layer 4 and the terminals are not in correct scale. FIG. 2 further shows a layer 6 of plastic material, preferably PET (polethyleneterephthalate) which has been brought in contact on the heating layer by the blow-molding step and which has to be temporarily heated up to the heat-setting temperature before cooling.

FIG. 3 shows the measuring pulses 9 and the heating pulses 10. The frequency is determined by the time between succeeding measuring pulses 9 as indicated by the reference numeral 7. As a function of the temperature the heating layer exhibits a resistance which determines the amplitude of the measuring pulse 9. The amplitude is measured and is compared with a desired value in a control circuit conventional and not shown. The comparison of the pulse 9 and the desired value results in an error signal which determines the length of the heating current pulse 10 which is supplied to the heating layer after the time 8 which is reserved for measuring the temperature. The length of the heating pulse 10 may be controlled within the time 11 which must end before the time 7 defining the beginning of the next measuring pulse.

Figure 1:
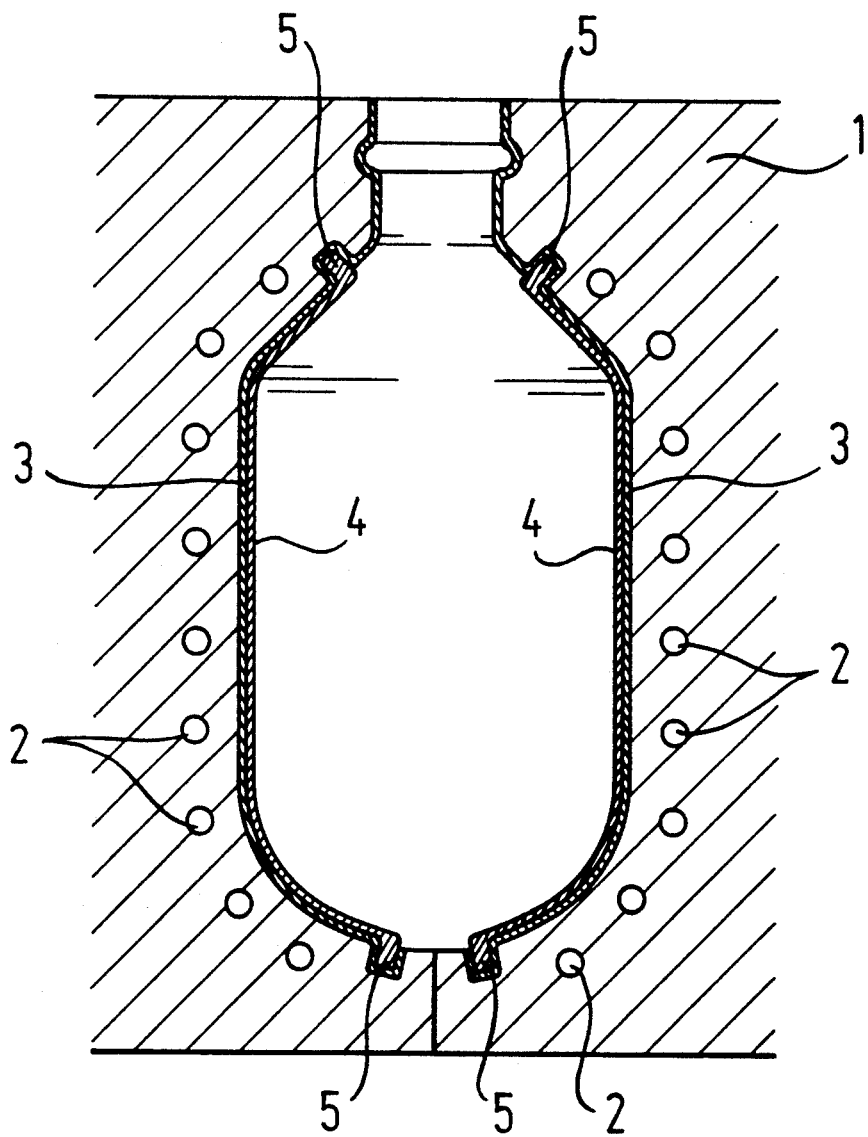
FIG. 1 shows a section through a blow-mold.
Figure 2:
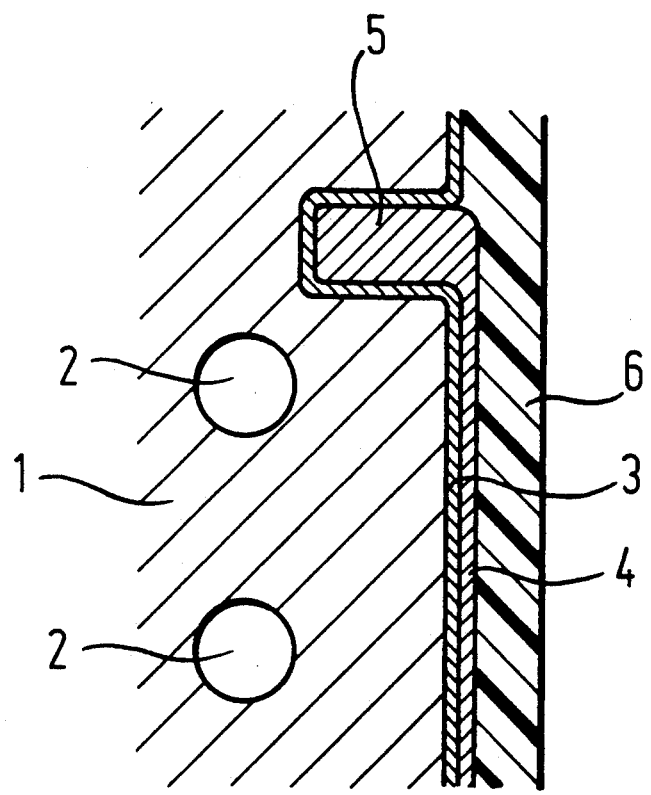
FIG. 2 shows a partial section of FIG. 1 in an enlarged scale.
Figure 3:
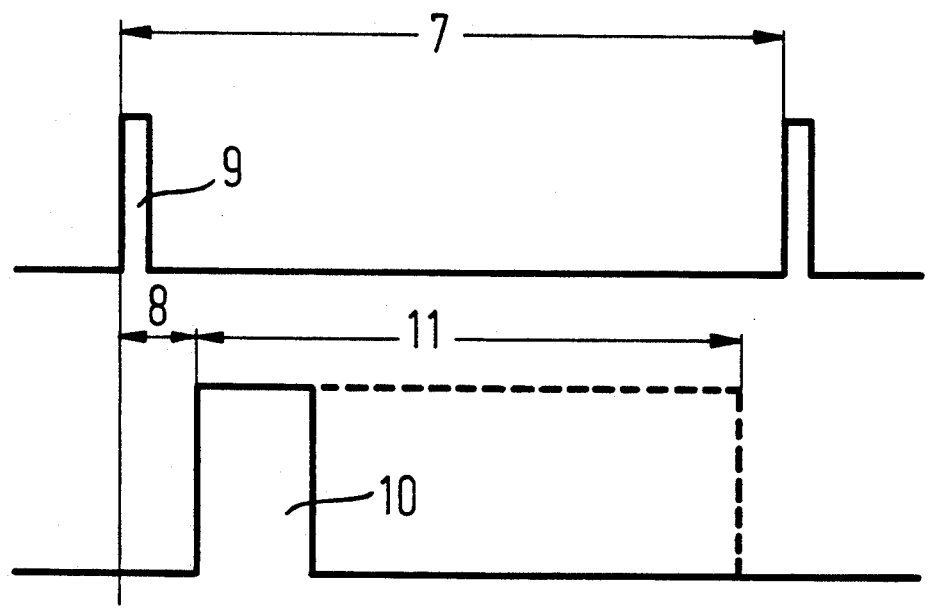
FIG. 3 illustrates measuring and heating pulses.

During the heating phase there is a temperature drop from the surface of the heating layer 4 through the isolating layer 3 and the blow-mold body 1 to the cooling passages 2. This temperature drop is relatively steep as some seconds are sufficient for the heating phase to heat the thin bottle wall 6 to the temperature desired. As an example the wall thickness is about 0.3 to 0.4 mm. After the heating phase is terminated the cooling phase needs a multiple of the heating time.

We claim:

1. A method for heating and cooling the surface of a thermoplastic material in a mold body comprising bringing the thermoplastic material into contact with a very thin heating layer provided on the body by blow-molding, the heating layer being isolated from the body by an electrically insulting layer, supplying heating current pulses to the heating layer, measuring the temperature responsive resistance of the heating layer using measuring current pulses which are supplied to the heating layer in the intervals between the heating current pulses to measure the temperature of the surface of the thermoplastic material, and controlling the duration and/or the amplitude of the heating current pulses in response to the measuring current pulses.

2. The method of claim 1, wherein a number of measuring pulses is averaged and determines the next following heating pulses or the next following group of heating pulses.

3. The method of claim 1, wherein the amplitude of each measuring current pulse supplied to the heating layer is measured just before the start of the next heating current pulse cycle.

4. The method claim 1, wherein the amplitude of each measuring current pulse is a function of the temperature of the heating layer.

5. The method of claim 4, further comprising comparing the amplitude of each measuring current pulse with a desired amplitude value indicative of a desired temperature of the heating layer, and producing a comparison signal for determining the duration and/or the amplitude of the next heating current pulse which is supplied to the heating layer after the time in which the temperature has been measured.

* * * * *